United States Patent
Kazmi et al.

(10) Patent No.: US 10,624,066 B2
(45) Date of Patent: Apr. 14, 2020

(54) METHOD AND APPARATUS FOR CONTROL-SIGNAL TRANSMISSION IN A WIRELESS COMMUNICATION SYSTEM

(71) Applicant: Telefonaktiebolaget LM Ericsson (publ), Stockholm (SE)

(72) Inventors: Muhammad Kazmi, Sundbyberg (SE); Christopher Callender, Kinross (GB); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/580,380

(22) PCT Filed: Oct. 31, 2017

(86) PCT No.: PCT/SE2017/051072
§ 371 (c)(1),
(2) Date: Dec. 7, 2017

(87) PCT Pub. No.: WO2018/084783
PCT Pub. Date: May 11, 2018

(65) Prior Publication Data
US 2018/0317212 A1    Nov. 1, 2018

Related U.S. Application Data

(60) Provisional application No. 62/417,595, filed on Nov. 4, 2016.

(51) Int. Cl.
*H04B 7/00* (2006.01)
*H04W 72/04* (2009.01)
(Continued)

(52) U.S. Cl.
CPC ....... *H04W 72/0406* (2013.01); *H04W 24/10* (2013.01); *H04W 56/00* (2013.01); *H04W 72/042* (2013.01); *H04L 5/0053* (2013.01)

(58) Field of Classification Search
CPC .......... H04W 56/0015; H04W 56/003; H04W 84/12
(Continued)

(56) References Cited

U.S. PATENT DOCUMENTS 9,496,975 B2 * 11/2016 El Ayach ............ H04W 52/242
9,843,427 B2 * 12/2017 Urabayashi ........... H04W 48/12
(Continued)

FOREIGN PATENT DOCUMENTS

WO    2012111937 A2    8/2012
WO    2014043922 A1    3/2014
(Continued)

OTHER PUBLICATIONS

3GPP, "3rd Generation Partnership Project; Technical Specification Group Radio Access Network; Study on New Radio (NR) Access Technology Physical Layer Aspects (Release 14)", 3GPP TR 38.802 V0.3.0 (Oct. 2016), Oct. 2016, 1-43.
(Continued)

*Primary Examiner* — Dmitry Levitan
(74) *Attorney, Agent, or Firm* — Murphy, Bilak & Homiller, PLLC

(57) ABSTRACT

The disclosure relates to a method and a wireless device for communication in a wireless communication network, the method comprising the steps of obtaining information of a level of duplication of one or more common control signals or channels; and receiving the common control signals or channels using the obtained information. The method further relates to a network node and a method thereof.

7 Claims, 11 Drawing Sheets

(51) Int. Cl.
*H04W 56/00* (2009.01)
*H04W 24/10* (2009.01)
*H04L 5/00* (2006.01)

(58) Field of Classification Search
USPC ............... 370/310, 328–330, 350, 503, 509, 370/511–514
See application file for complete search history.

(56) References Cited

U.S. PATENT DOCUMENTS

| | | | |
|---|---|---|---|
| 10,349,324 B2* | 7/2019 | Tsai | H04W 24/10 |
| 2016/0359600 A1* | 12/2016 | Krzymien | H04L 5/0048 |
| 2017/0311276 A1* | 10/2017 | Tsai | H04B 7/0617 |
| 2018/0041316 A1* | 2/2018 | Ko | H04L 5/0007 |
| 2018/0049064 A1* | 2/2018 | Li | H04W 28/10 |
| 2018/0091287 A1* | 3/2018 | Ly | H04W 4/70 |
| 2018/0102931 A1* | 4/2018 | Ko | H04L 27/2662 |
| 2018/0219662 A1* | 8/2018 | Kim | H04L 5/005 |
| 2019/0173656 A1* | 6/2019 | Takeda | H04L 5/0037 |

FOREIGN PATENT DOCUMENTS

| | | |
|---|---|---|
| WO | 2016045704 A1 | 3/2016 |
| WO | 2017132985 A1 | 8/2017 |
| WO | 2017167010 A1 | 10/2017 |
| WO | 2017195048 A1 | 11/2017 |

OTHER PUBLICATIONS

Unknown, Author, "Work Plan for Rel-15 NR WI", 3GPP TSG RAN WG1, Meeting #90bis, R1-1718177, NTT Docomo, Inc., Prague, CZ, Oct. 9-13, 2017, pp. 1-174.

* cited by examiner

| Subcarrier spacing in kHz | OFDM symbol duration in μs | Cyclic prefix length in μs | Total symbol duration in μs |
|---|---|---|---|
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

Table 1

METHOD AND APPARATUS FOR CONTROL-SIGNAL TRANSMISSION IN A WIRELESS COMMUNICATION SYSTEM

TECHNICAL FIELD

The present disclosure relates to a wireless device and a network node for a wireless communication system. Furthermore, the present disclosure also relates to a corresponding, methods, computer programs and computer program products.

BACKGROUND

The fifth generation of mobile telecommunications and wireless technology is not yet fully defined but is currently in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in 3GPP TR 38.802 V0.3.0 (2016-10), of which a draft version has been published as R1-1610848. Final specifications may be published inter alia in the future 3GPP TS 38.2** series."

In a wireless communication system, a wireless device, such as a user equipment or UE, needs to be able to receive and measure various common control signals. As an example, NR defines at least two types of synchronization signals NR-PSS, used at least for initial symbol boundary synchronization to the NR cell, and NR-SSS, used at least for detection of NR cell ID or at least part of NR cell ID. NR-SSS detection may typically be based on the fixed time/freq. relationship with NR-PSS resource position irrespective of duplex mode and beam operation type at least within a given frequency range and CP overhead. NR further defines at least one common control signals as the broadcast channel: NR-PBCH. NR-PBCH decoding may be based on the fixed relationship with NR-PSS and/or NR-SSS resource position, irrespective of duplex mode used and beam operation type used, at least within a given frequency range and CP overhead. PSS, SSS and/or PBCH may be transmitted within a synchronization signal 'SS block'. One or multiple 'SS block(s)' may compose an 'SS burst'. One or multiple 'SS burst(s)' may compose a 'SS burst set'.

From 3GPP RAN1 specification perspective, the NR air interface defines at least one periodicity of the SS burst set.

A network node typically communicate in the wireless communication network by using one or more sets of radio resources selected from a total set of radio resources, e.g. resource blocks of a carrier or bandwidth. Common control signals may be repeated or duplicated using a particular subcarrier spacing. In an example using 3GPP NR, at least one subcarrier spacing for each synchronization signal, e.g. NR PSS, SSS, PBCH, is predefined in the 3GPP specification for a given frequency range. If multiple antenna beams are used to transmit the one or more control signals, at least the time index of SS-block is indicated to the UE. For the purpose of initial access by a UE, the UE can assume a control signal using radio resources corresponding to a specific subcarrier spacing of NR-PSS/SSS in a given frequency band given by the 3GPP specification. In a further example using 3GPP NR, the transmission of SS burst sets are periodic. For the purpose of initial access by a UE, the UE may assume a default periodicity of SS burst set transmission for a given carrier frequency, e.g. given by the 3GPP specification.

A first problem with conventional solutions is that the wireless device, e.g. a sub-band UE, may only be capable of or configured to receiving only to receive only some or a subset of transmission bandwidth of the serving network node. A second problem is that the wireless device may only be capable of or be configured to use a subset of the numerologies transmitted by the network node. Since the different numerologies may be FDM or TDM multiplexed, this means that there may be certain time intervals, or certain frequency ranges used by the network node for transmission of common control signals which the UE is not able to receive. A further problem is that the wireless device needs to be able to receive and measure various common control signals from a neighboring cell in the wireless communication system or network, e.g. to detect a cell prior to reporting, or prior to reselecting to the cell, or when the device is first powered on and needs to find a suitable cell to access.

Some conventional systems solve this by applying predetermined density or predetermined duplication of the control signals in the time or the frequency domain. Duplication could involve either transmitting identical symbols at different times or on different sub-carriers or the duplication could involve transmitting modified symbols at different times and frequencies where the means of modifying the common control signals in the duplication process is known to the UE.

A problem with applying predetermined density or predetermined level of duplication is that the transmission of common control signals constitutes a large overhead. Such signals are typically transmitted over the entire coverage area of a cell so may not be beam-formed and/or may need to be transmitted with high power. Transmitting duplicates of common control signals thus has a high cost in terms of resources consumed, which reduces the available network capacity, throughput etc.

Thus there is a need to provide a solution which mitigates or solves the drawbacks and problems of conventional solutions.

SUMMARY OF THE INVENTION

An objective of embodiments of the invention is to provide a solution which mitigates or solves the drawbacks and problems of conventional solutions. The above and further objectives are achieved by the subject matter of the independent claims.

Further advantageous implementation forms of the invention are defined by the dependent claims.

The above objectives are solved by the subject matter of the independent claims. Further advantageous implementation forms of the present invention can be found in the dependent claims.

According to a first aspect of the disclosure, the above mentioned and other objectives are achieved by a method in a network node for communication in a wireless communication network, the method comprising the steps of obtaining information of a level of duplication of one or more common control signals or channels and receiving the common control signals or channels using the obtained level of duplication.

According to a second aspect of the disclosure, the above mentioned and other objectives are achieved by a method in a wireless device for communication in a wireless communication network, the method comprising the steps of obtaining information of a level of duplication of one or more common control signals or channels and receiving the common control signals or channels using the obtained level of duplication.

An advantage of the invention is that it reduces the overhead of transmitting common control signals, by adapting the duplication of common control signals in time or frequency and thus only performing duplication when needed. This may include considering the UEs which are currently present in the cell, or likely to be entering coverage of the cell. Some duplication may be needed, but not all possible duplicates of the common control signals may be necessary. By letting the network determine the necessary level of duplication (i.e., that a certain duplication of the signal is not necessary and its transmission may be avoided), the use of resources consumed by that duplication can be avoided. This may improve network capacity/throughput and/or reduce interference experienced in other cells. Since common control signals are typically broadcast over a wider area, the resources consumed to transmit them may be considerable.

Further applications and advantages of embodiments of the invention will be apparent from the following detailed description. The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The appended drawings are intended to clarify and explain different embodiments of the invention, in which.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
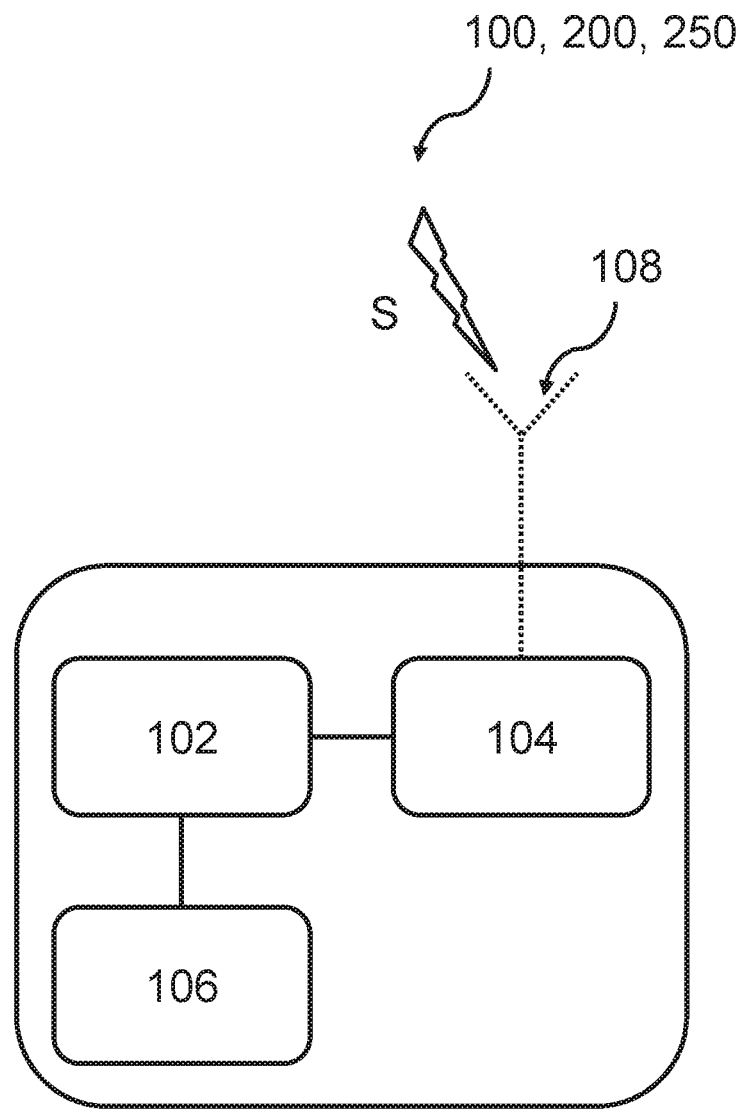
FIG. 1 shows a wireless device according to an embodiment of the present disclosure.

In the following disclosure further embodiments of the disclosure are described in mainly 3GPP context with its terminology. However, embodiments of the disclosure are not limited to 3GPP communication systems, such as LTE and LTE Advanced.

In the future, and particularly with the introduction of the so-called New Radio, or 5G radio access technology being studied in 3GPP, it is likely that even wider bandwidths than the maximum 20 MHz carriers used in LTE will be defined. Then, with e.g. 40, 50, 100, 200 MHz and even more than 1 GHz in high frequency spectra, there will be a need to support different types of handsets or user equipments, UE, on the carrier of a network node, and in particular, there will be a need to support handsets that do not have the capability or need to transmit over the full, say, 100 MHz bandwidth. The terminal might have the capability of only transmitting over e.g. 20 MHz, or the terminal might be currently configured to only transmit over 20 MHz. "Sub-band UEs" (SB_UE) here denote UEs that are configured, or do not support, transmission over the full carrier bandwidth. In particular, by SB UEs, we here denote UE's that transmit over a single sub-band, only. Such an SB UE might have the capability to transmit over multiple sub-bands, but it is currently configured to only transmit over a single sub-band.

"Wider-Bandwidth UEs", WB UEs, denote UEs that are configured or use a bandwidth that includes multiple sub-bands. Typically, such a WB UE may have at least one control region within its configured or used uplink bandwidth. We note that a WB UE is not necessarily configured to transmit over the whole carrier bandwidth, but it is currently configured to transmit over at least two sub-bands.

In some embodiments a non-limiting term "UE" is used interchangeably with wireless device 100. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), TP (transmission point), TRP (transmission reception point), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a wireless device/UE or a radio network node.

The embodiments herein are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The terms common signal or common control signal are used interchangeably herein. The term common channel or common control channel are used interchangeably herein. The term common signal or channels or common control signal/channel used herein may comprise wireless signals comprising control information, typically transmitted from a sender to one or more receivers, e.g. a network node transmitting control information relevant to UEs in that cell. Examples of the common control signal/channel may be synchronization signals, reference signals, broadcast channels, etc. One important usage of common control signals is for detection of cells for mobility purposes. Common control signals, e.g. PSS/SSS/PBCH signals, may e.g. be duplicated in frequency domain so that there is a signal in each 5 MHz sub-block of a 80 MHz carrier, i.e. 16 duplicates. A PSS/SSS/PBCH may not occupy the whole of each 5 Mhz sub-block—for instance in LTE these signals occupy 6RB=1.4 MHz. If there are 16 duplicated common control signals like this, then an MTC UE can detect the cell and decode the PBCH whatever sub-block it is operating on. Common control signal/channels may comprise a SS burst set. Common control signals/channels may comprise:

- Synchronization signals such as primary synchronization signal, secondary synchronization signal (PSS, SSS, or generically xSS)
- Broadcast channel, also known as physical broadcast channel (PBCH) which may carry system information or some part of the system information known as essential system information
- Reference signals which are known symbols transmitted to allow various operations to be performed including measurement of the network node. Measurement metrics could involve measurement of received signal strength indication, signal quality, signal to noise and interference ratio (SINR), reference signal received power etc.

The term time resource used herein may correspond to any type of physical resource/s or radio resource/s expressed in terms of length of time. Examples of time resources are: symbol, time slot, sub-frame, radio frame, TTI, interleaving time, etc.

The term frequency resource used herein may correspond to any type of physical resource/s or radio resource/s expressed in terms of frequency or spectrum width. Examples of frequency resources are: one or more physical radio channels.

The term radio resource used herein may correspond to any type of physical resource or radio resource defined by at least one time resource and at least one frequency resource.

The term bandwidth (BW) used herein is range of frequencies over which a node transmits to and/or receives signal from another node. The BW is interchangeably called as operating bandwidth, channel bandwidth, system bandwidth, configured bandwidth, transmission bandwidth, cell bandwidth, cell transmission BW, carrier bandwidth or a total set of radio resources used by a node.

The term measurement bandwidth (BW) used herein is range of frequencies over which a node performs one or more radio measurements on signals transmitted to and/or signals received from another node. The measurement BW is interchangeably called as allowed measurement bandwidth, maximum allowed measurement BW, PRS bandwidth, PRS measurement BW, positioning measurement BW etc.

The term radio access technology, or RAT used herein, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The BW or measurement BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc.

The term requirements used herein may comprise any type of UE requirements related to UE measurements aka measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

The term duplication of a signal used herein may correspond to either transmitting an identical sequence of symbols at a different time interval, and/or a different frequency interval, or transmitting a modified sequence of symbols at a different time interval and/or a different frequency interval, where the modifications to the symbol sequence can be known to the UE (e.g., pre-defined such as based on specifications or determined based on a rule or a message from another node).

The term duplication level and/or level of duplication used herein may be used interchangeably with "density", and signifies any one of a measure of the ratio between the number of radio resources mapped for or used for transmission of one or more duplicated common control signals and the total set of radio resources or the transmission bandwidth of the network node/a cell of the network node, types of signals or channels to be duplicated, number of duplicated signals or channels, radio resources to be used, a distance and/or periodicity of sets of radio resources mapped for or used for transmission of duplicated common control signals within the network node and/or cell bandwidth. As previously mentioned, the types of signals or channels to be duplicated may be synchronization signals, reference signals, broadcast channels, etc.

A problem is that the user equipment needs to be able to receive and measure various common control signals. Also, it may either only be capable of receiving, or may have been configured only to receive a subset of the bandwidth transmitted by a network node. Alternatively, it may only support, or may only be configured to use a subset of the numerologies transmitted by a network node. Since the different numerologies may be FDM or TDM multiplexed, this means that there may be certain time intervals, or certain frequency ranges transmitted by the network node which the UE is not able to receive. If the UE is unable to receive a certain part of the bandwidth or the UE is unable to receive a certain time interval, either due to the configuration it is operating with, or limitations in the bandwidths/numerologies that it supports then it is obvious that it cannot receive common control signals that are transmitted within time intervals or bandwidths that it does not support or is not configured to use. It is also important to recognize that reception of common control signals from a neighbor cell in the network may be needed from time to time, for instance to detect a cell prior to reporting, or prior to reselecting to the cell, or when the device is first powered on and needs to find a suitable cell to access. Relatively straightforward prior art solutions can be considered to ensure that the important common control information is available for all UEs that need to make use of it, such as UEs that are operating in neighbor cells and attempting to detect signals being transmitted by the cell under consideration. An obvious solution to the problem is duplication of the control signals in time or frequency domain. Duplication could involve either transmitting identical symbols at different times and/or on different subcarriers. Duplication could also involve transmitting modified symbols at different times and frequencies where the means of modifying the common control signals in the duplication process is known to the UE. Moreover, UEs which are capable of receiving more than one duplicate copy of the common control information may advantageously use the multiple copies, for example to improve detection performance in noise or interference. The agreements from RAN1 refer to terms such as SS-block, SS-burst and SS-burst set, which implies that duplication in both time and frequency of PSS, SSS and PBCH is considered by RAN1. The main problem with such duplication is that the transmission of common control signals constitutes a large overhead. Such signals are typically transmitted over the entire coverage area of a cell so may not be beam-formed and/or may need to be transmitted with high power. Transmitting duplicates of common control signals thus has a high cost in terms of resources consumed, which reduces the available network capacity, throughput etc.

FIG. 1 shows a radio node 100, 200, 250 according to a first embodiment of the present disclosure. The radio node may be a wireless node 100, a network node 200 or a neighboring network node 250. The radio node 100, 200, 250 comprises a processor 102 communicatively coupled to a transceiver 104. Further, the radio node 100, 200, 250 may further comprise at least one optional antenna 108, as shown in FIG. 1. The antenna 108 is coupled to the transceiver 104 and is configured to transmit and/or emit and/or receive a wireless signals in a wireless communication system, e.g. emit transmission data as the wireless signals S. In one example, the processor 102 may be any of processing circuitry and/or a central processing unit and/or processor modules and/or multiple processors configured to cooperate with each-other. Further, the radio node 100, 200, 250 may further comprise a memory 106. The memory 106 may contain instructions executable by the processor to perform the methods described herein. The processor 102 may be communicatively coupled to a selection of the transceiver 104 and the memory 106.

Figure 2:
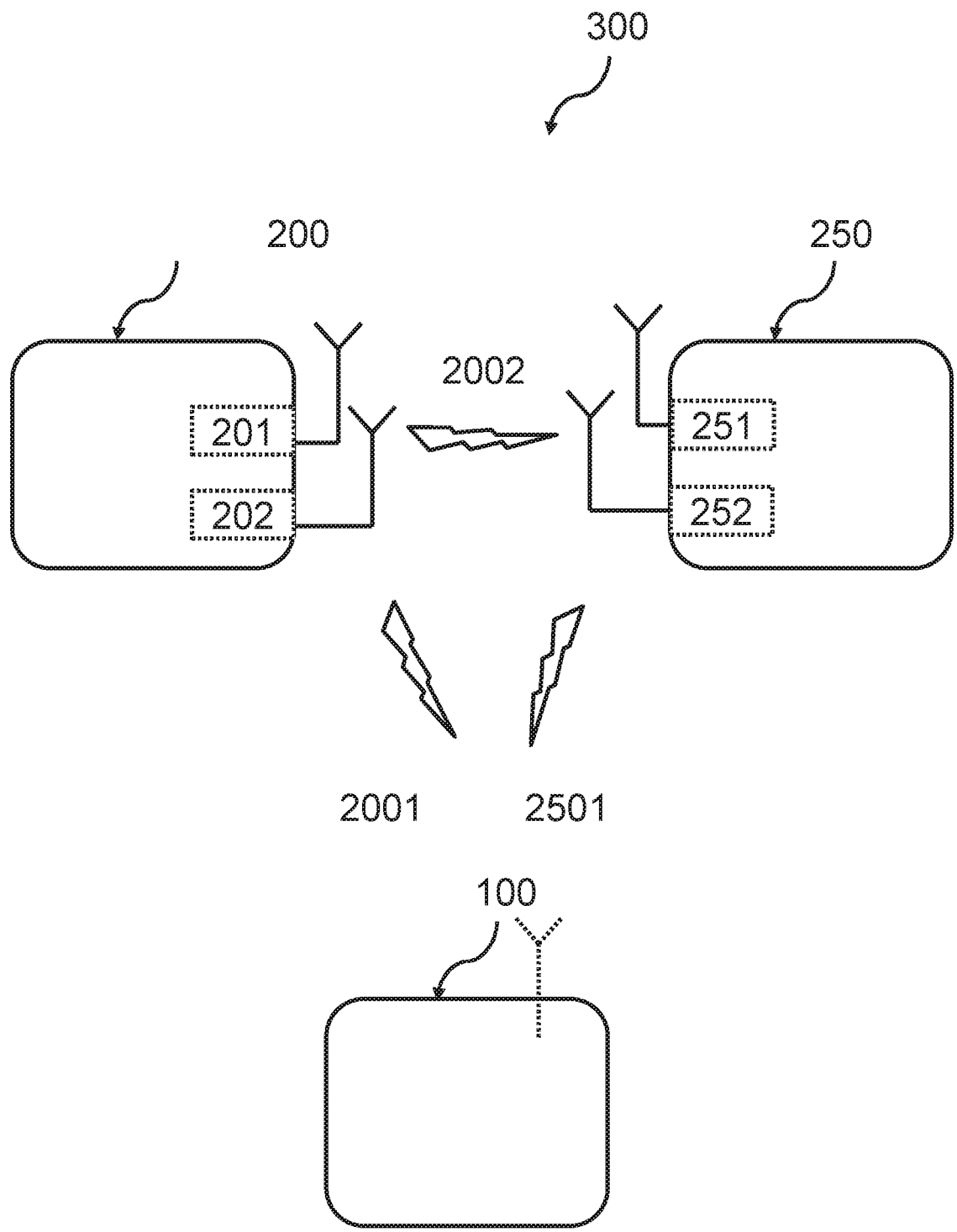
FIG. 2 shows a wireless communication system according to an embodiment of the present disclosure.

FIG. 2 shows a wireless communication system 300 according to an embodiment of the present disclosure. The wireless communication system 300 may comprise radio nodes in the form of a wireless device 100, a network node 200 and a neighboring network node 250. The wireless device 100 is configured and/or operative to receive common control signals 2001 from the network node 200 and optionally to receive neighboring common control signals 2501 from the neighboring network node 250. The network node 200 may comprise a plurality of transceivers 201, 202, also referred to as cells herein, which may be configured to transmit or receive on the same or different bandwidths. The neighboring network node 250 may comprise a plurality of transceivers 251, 252, also referred to as cells herein, which may be configured to transmit or receive on the same or different bandwidths. The network node 200 may be configured and/or operative to transmit common control signals 2001 to the wireless device 100 and/or to transmit a control signal 2002 to the neighboring network node 250, e.g. within the total set of radio resources or the transmission BW of the network node 200. The neighboring network node 250 may be configured and/or operative to transmit common control signals 2501 to the wireless device 100, e.g. within the total set of radio resources or the transmission BW of the neighboring network node 250, and/or to receive a control signal 2002 from the network node 200 an/or to transmit a neighboring control signal (not shown in the figure) to the network node 200. The network node 200 or the neighboring network node 250 may use any suitable RAT, as defined above. The wireless device 100 may be configured with a capability or a configuration to transmit/receive only in a subset of the total set of radio resources or the transmission BW of the network node 200. The wireless device 100 may be configured with a capability or a configuration to transmit/receive only in a subset of the total set of radio resources or the transmission BW of the neighboring network node 250.

Figure 3:
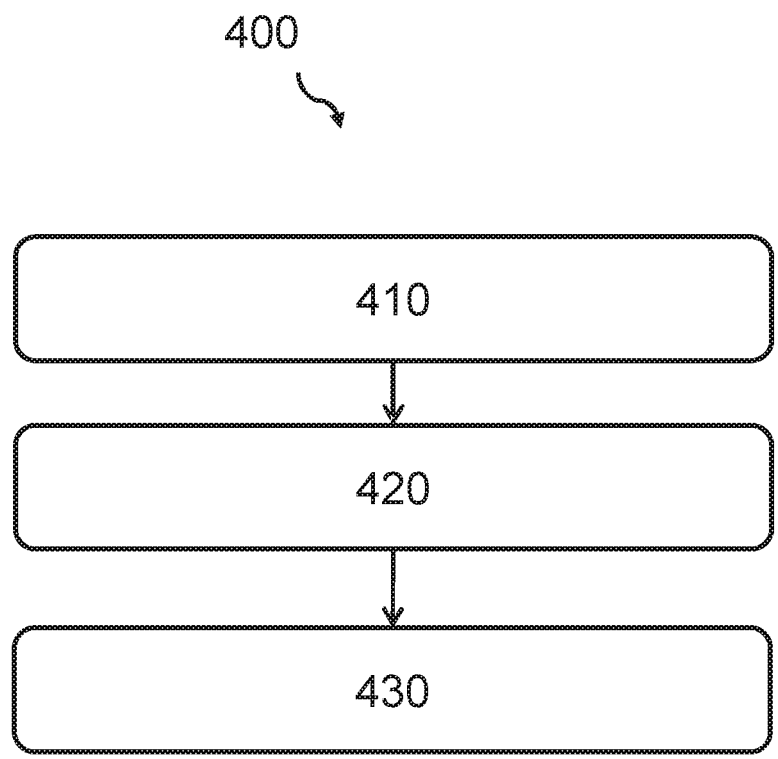
FIG. 3 shows a flowchart of a method performed by a network node according to an embodiment of the present disclosure.

FIG. 3 shows a flowchart of a method 400 performed by a network node 200 configured for communication in a wireless communication network 300 according to an embodiment of the present disclosure. The network node 200 may be configured for communication in a wireless communication network 300 by using one or more sets of radio resources selected from a total set of radio resources or network node transmission bandwidth.

The method may comprise:

obtaining (410) information indicating a level of duplication of one or more common signals or channels; and transmitting (430) the one or more common control signals or channels (2001), using the obtained level of duplication, to at least one wireless device (100).

The method may comprise obtaining (410) information by:

determining 410 a density and/or a level of duplication of duplicated common control signals, transmitting 430 the duplicated common control signals 2001 based on the density and/or the level of duplication.

In one example, the level of duplication may indicate a ratio between a particular number of radio resources used to transmit a common control channel and the total number of radio resources of the total set of radio resources used by the network node, e.g. a percentage. In one example, the level of duplication may indicate a particular number of radio resources to be used to transmit the common control channel. In one example, the level of duplication may indicate the time or frequency resources to be used to transmit the common control channel. In one example, the level of duplication may indicate a separation distance or periodicity in time between radio resources to be used to transmit the common control channel, e.g. a separation distance or periodicity/repetition in frequency and/or time between the radio resources.

In an embodiment, the method further comprises mapping 420 one or more sets of radio resources, selected from a total set of radio resources or the transmission bandwidth of the network node 200, based on the density and/or level of duplication. Transmitting 430 the duplicated common control signals 2001 may comprise using the one or more sets of radio resources In an embodiment, the method further comprises transmitting a message or indication 2002 to a second network node 250 indicative of the obtained level of duplication.

In one example, a wireless device 100 is served by the network node 200 and is a Sub-band UE that support only 5 MHz reception bandwidth, e.g. NR MTC devices. The network node 200 is configured with a NR single carrier with a BW of 80 MHz. The network node may have pre-defined information or receive an indication from the wireless device 100 that a duplication of 16 is needed for the wireless device to receive one or more common control signals. The network node 200 may then determine 410 a density and/or level of duplication of duplicated common control signals of 16. The common control signals, e.g. PSS/SSS/PBCH signals, are then duplicated in the frequency domain so that there is a signal in each 5 MHz sub-block of the 80 MHz carrier, i.e. 16 duplicates. A PSS/SSS/PBCH may not occupy the whole of each 5 Mhz sub-block—for instance in LTE these signals occupy 6RB=1.4 MHz. If there are 16 duplicated common control signals like this, then an MTC UE can detect the cell and decode the PBCH whatever sub-block it is operating on.

In one further example, a single Sub-band UE is served. The network node may have pre-defined information or receive an indication from the wireless device 100 that only one UE is served by the entire 80MHz carrier and that level of duplication of 16 is used. The network node 200 may then determine 410 a density and/or level of duplication of duplicated common control signals is sufficient and optionally determine on which radio resources to transmit the one or more common control signals. The system overhead can then be reduced and thus improve radio quality etc.

In an embodiment, the obtained level of duplication indicates any of types of signals or channels to be duplicated, a number of duplicated signals or channels and radio resources to be used to transmit 430 the one or more common control signals or channels 2001.

Examples of such common control signals, common control signals, common channels, or common control channels to be duplicated are synchronization signals, reference signals, broadcast channels, etc. Synchronization signals may be primary synchronization signal, secondary synchronization signal (PSS, SSS, or generically xSS). Broadcast channels may be broadcast channels BCH or physical broadcast channels PBCH. Reference signals may be pilot signals etc.

In an embodiment, the one or more common control signal or channels comprise at least one of: synchronization signals, broadcast channels, PBCH, or signals/channels.

In an embodiment, the one or more common control signal or channels are comprised in an SS block.

In an embodiment, determining 410 a density/duplication level may be based on a pre-defined value, a pre-defined rule, a message or indication received from UE or another network node. The density may be expressed as a separation distance or periodicity in time between the one or more sets of radio resources. The density may further be expressed as a separation distance or periodicity/repetition in frequency between the one or more sets of radio resources.

In an embodiment, determining 410 the density may further be based on radio resources configuration information of at least one wireless device 100, e.g. via signaling a Wireless Device Message, WDM, from the wireless device 100 or by detecting that one or more wireless devices are present in an area or cell associated with the coverage of the at least one radio signal/channel. The one or more wireless devices may have a specific demand, e.g., capability, configuration, preference, etc., related to the density or duplication level. Determining 410 a density may further comprise determining an adapted density and signaling the adapted density to the wireless device 100 in a message.

In one embodiment, the obtained level of duplication comprises a density indicative of duplicated common control signals of a total set of radio resources used by the network node 200. The method further comprises determining an adapted density based on the obtained level of duplication, wherein the adapted density is not exceeding the obtained density, and sending the message or indication comprising the adapted density to the wireless device 100.

Determining the adapted density or density may further comprise detecting one or more wireless device which does not have the capability or is not configured to receive some or all of the common control signals of the serving or target cell. The network node may then reconfigure the wireless devices, e.g. reconfiguring the receiving bandwidth, such that additional or all of the common control signals of the serving or target cell may be received.

The adapted density is defined in a similar manner as density, described previously. I.e. A adapted density or adapted level of duplication of the control signals indicate a rate of duplication of the common control signals related to the available physical resources for transmission in the time or the frequency domain. Duplication could involve either transmitting identical symbols at different times or on different sub-carriers or the duplication could involve transmitting modified symbols at different times and frequencies where the means of modifying the common control signals in the duplication process is known to the UE.

Determining 410 the adapted density or density may further comprise detecting that one or more of the duplicated common control signals (2001), which are transmitted or are about to be transmitted, which is not essential to the operation of at least one UE served by the network node 200, e.g. via a serving cell, or the neighboring network node 250 and refrain from transmitting the non-essential common control signals. Thus a reduced and adapted density of duplicated common control signals (2001) is determined based on the previously determined or obtained density.

In one example, it may be determined that a single Sub-band UE is being served and that the UE is only capable of receiving a 5 MHz signal out of the total 80 MHz carrier. Thus 15 out of the 16 duplicated common control signals (2001), which are about to be transmitted will not be received by the UE and are thus not essential to the operation of the UE. Determining that cone or more common control signals (2001) which are about to be transmitted are not essential to the operation of the UE may e.g. be based on radio resources configuration information of the at least one wireless device 100. I.e. the previously determined or obtained density of 16 duplicated common control signals (2001) in one 80 MHz carrier and the radio resources configuration information (UE capability 5 MHz signal out of the total 80 MHz carrier) are used to determine an adapted density of 1 duplicated common control signal (2001) in one 80 MHz carrier.

In an embodiment, the density and/or the adapted density is expressed as a periodicity in time between the one or more sets of radio resources.

In an embodiment, the density and/or the adapted density is expressed as a distance in frequency between the one or more sets of radio resources.

In an embodiment, the adapted density is based on bandwidth capability of the wireless device 100.

In an embodiment, determining the adapted density is based on a selection of any of radio resources configuration information of the at least one wireless device 100, radio resources capability information of at least one wireless device 100 or information indicative of one or more duplicated common control signals, which are transmitted or are about to be transmitted, which are not essential to the operation of at least one UE.

In an embodiment, the method may further comprise transmitting a control signal 2002 to a second network node 250 indicative of the density of duplicated common control signals and/or the plurality of sets of radio resources.

In an embodiment, the method further comprises transmitting 430 the duplicated one or more common control signals or channels 2001 using the one or more sets of radio resources.

In an embodiment, the method further comprises transmitting a control signal 2002 to a second network node 250 indicative of the adapted density and/or the one or more sets of radio resources.

In yet an embodiment, the method 400 further comprising obtaining one or more results in response to transmitting 430 the duplicated common control signals 2001. In an example, the obtained results may be measurement results, result of cell or beam identification, result of channel reading such as reporting an identity comprised in the read channel, etc. The method 400 may further comprise using the obtained results for one or more operational tasks, and/or sending the obtained results to another radio node.

In a first example embodiment, the network node 200 determines if the common control signals, such as SS burst set, which it has currently determined to transmit contain duplications which can be received by all the UEs which are present in the network node's 200 target cell and neighbor cells of the target cell, considering the capabilities and configuration of the UEs in the target and neighbor cells. If the common control signals, such as a SS burst set, which the network node has determined to transmit cannot be received by all the UEs which are present in the target cell and neighboring cells, then an additional duplication or duplications of the common control signals are transmitted.

In a second example embodiment, a neighbor cell is informed that it is serving a wireless device which does not have the capability to receive some or all of the common control signals of the serving or target cell. The target cell may indicate an alternative configuration for the UE which would allow it to receive the common control signals to the target cell. In response to being informed, the target cell or neighbor cells may reconfigure the UE such that it is able to receive one or more common control signals of the target cell. The network node then determines if the common control signals, such as SS burst set, which it has currently determined to transmit includes at least one duplication which is not essential to the operation of at least one UE in the target cell or neighbor cells.

In a third example embodiment, the network node determines if at least one duplication would become non-essential to the operation of all UEs in the target cell or neighbor cells if at least one UE was reconfigured based on the determination the network node ceases transmission of at least one duplication of a common control signal. The network node may then determine an adapted density of common control signals which does not include the non-essential common control signals/duplications in the target cell or neighbor cells.

In a fourth example embodiment, the network node determines if at least one duplication would become non-essential to the operation of all UEs in the target cell or neighbor cells if at least one UE was reconfigured. Based on the determination, the network node reconfigures at least one UE and ceases transmission of or refrains from transmitting at least one duplication of a common control signal. In response to indications from at least one UE, that it is unable to attempt to search for a neighbor cell. E.g. as it is not transmitting a duplication of the neighbor common control signal that the UE is capable of, or is currently configured to, receiving. The network node 200, requests the neighboring network node 250 to commence transmission of at least one additional duplication of a common control signal. Information on the bandwidth and numerology support of UEs operating while connected to a network node may be shared to neighboring network nodes as radio resources configuration information. Information on the radio resources configuration of UEs, e.g. configured bandwidth, configured numerology etc., while connected to a network node may be shared to neighboring network nodes. This information may be used to allow the neighbor network node to perform step determining 410 a density or obtaining one or more results as previously described. The network node may then determine an adapted density of common control signals which does not include the non-essential common control signals/ duplications in the target cell or neighbor cells.

In a fifth example embodiment, the network node may determine whether to transmit duplicated common control signals in different frequency resources within the transmission bandwidth of the cell in the same or different time resources based on bandwidth related information. In one specific exemplary embodiment the network node may determine whether to transmit duplicate common control signals within transmission bandwidth of the cell if the cell BW is larger than a threshold. In a second specific exemplary embodiment the network node may determine whether to transmit duplicate common control signals within transmission bandwidth of the cell based on a relation between the cell transmission BW and UE bandwidth of at least K1 number of UEs, where K1≥1. Duplicate common control signals within frequency resources within the transmission bandwidth of the cell can then be determined as non-essential as no UE is configured to receive them. The network node may then determine an adapted density of common control signals which does not include the non-essential common control signals/duplications in the target cell or neighbor cells.

In a sixth example embodiment, the network node may determine whether to transmit duplicated common control signals in different frequency resources within the transmission bandwidth, BWc, of the cell in the same or different time resources based on bandwidth related information. Examples of BW related information is transmission BW of the cell, BWc, BW of one or more UEs using signals of the cell, relation between the UE BW and the cell transmission BW etc. Duplicate common control signals within time resources within the transmission bandwidth of the cell can then be determined as non-essential as no UE is configured to receive them. The network node may then determine an adapted density of common control signals which does not include the non-essential common control signals/duplications in the target cell or neighbor cells.

The network node may further determine the number of duplicated common control signals to be transmitted with the transmission BW of the cell based on bandwidth related information. In one specific example of this embodiment the network node may transmit duplicate common control signals within transmission bandwidth of the cell if the cell BW is larger than a first threshold (H1). In a second specific example of this embodiment the network node may transmit duplicate common control signals L1 times within transmission bandwidth of the cell if the cell BW is larger than a first threshold H1, where L1=f(BWc, H1). The network node may then determine an adapted density of common control signals which includes L1 common control signals/duplications in the target cell or neighbor cells.

A specific example of function, f, is ratio of BWc to H1. For example L1=BWc/H1. In a third specific example of this embodiment the network node may determine whether to transmit duplicate common control signals within transmission bandwidth of the cell based on a relation between the cell transmission BW and UE bandwidth of at least K2 number of UEs, where K2≥1. For example if the BW of at least one UE is smaller than cell BW by more than X MHz then the network node may decide to transmit duplicated common control signals in the cell. Duplicate common control signals within radio resources within the transmission bandwidth of the cell can then be determined as essential as the BW of at least one UE is smaller than cell BW by more than X MHz. The network node may then determine an adapted density of common control signals which includes the essential common control signals/duplications in the target cell or neighbor cells.

In a fourth specific example of this embodiment the network node may transmit, L2, duplicate common control signals within transmission bandwidth of the cell based on a relation between the cell transmission BW and minimum of the BW (BWm) of at least K2 number of UEs, where K2≥1. For example, L2=f1(BWc, BWm). A specific example of function, f1, is ratio of BWc to BWm. For example L2=BWc/BWm. In another example L2=f2(BWc, BWm, K2). A specific example of function, f2, is L2=K2*BWc/BWm. Duplicate common control signals within radio resources within the transmission bandwidth of the cell can then be determined as essential as the mBW of at least L2 UE fulfills a relation to the cell BW c. The network node may then determine an adapted density of common control signals which includes the essential common control signals/duplications in the target cell or neighbor cells.

In a seventh example embodiment, the network node may determine whether to transmit duplicated common control signals within transmission bandwidth of the cell based on UE requirement of a measurement and/or of reception of any signal, e.g. data channel, control channel etc. In one example, if the UE requirement of the UE measurement performed by the UE is worse than a threshold and/or if the pre-defined UE requirement of the UE measurement is not met by the UE then the network node may decide to transmit at least 2 or more duplicated common control signals. In one example, if the UE performed a signal measurement (e.g. RSRP) over a measurement period 500 ms but the pre-define measurement period is 200 ms then it means the UE has not met the requirement. In this case the network node may decide to apply duplicated common control signals related to at least a certain type of measurement e.g. RSRP. Duplicate common control signals within radio resources within the transmission bandwidth of the cell can then be determined as essential to fulfill a UE requirement of a measurement and/or of reception of any signal. The network node may then determine an adapted density of common control signals which includes the essential common control signals/duplications in the target cell or neighbor cells.

In an eighth example embodiment, the network node may determine whether to transmit duplicated signals based on the level of interruption to signals transmitted between the UE and the network node when the UE performs an operation, e.g. performing a radio measurement, on signals of a target cell, e.g. the serving and/or on the neighbor cells. Duplicate common control signals within radio resources within the transmission bandwidth of the cell can then be determined as essential dependent on a relation to the level of interruption to signals transmitted between the UE and the network node when the UE performs an operation. The network node may then determine an adapted density of common control signals which includes the essential common control signals/duplications in the target cell or neighbor cells.

Figure 4:
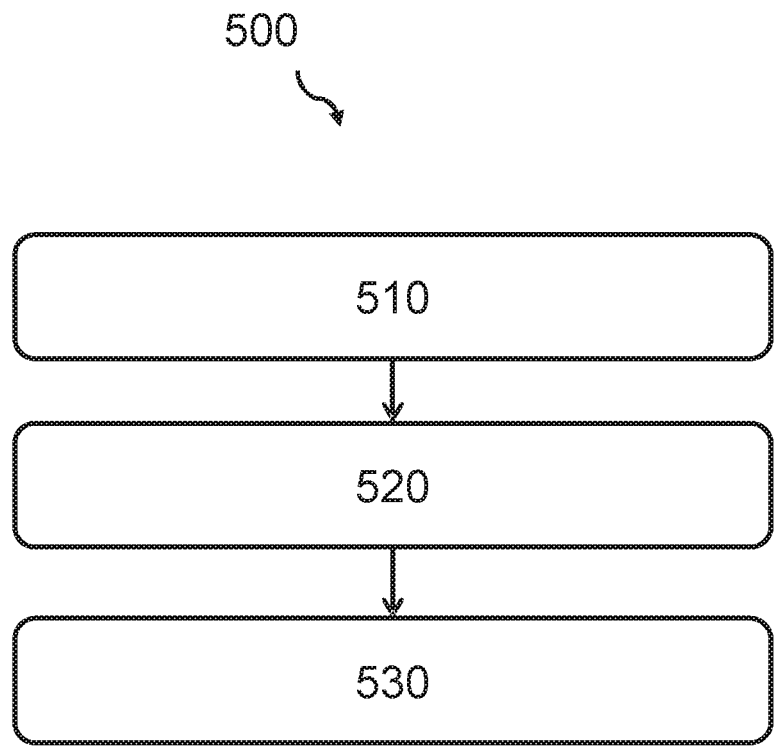
FIG. 4 shows a flowchart of a method performed by a first wireless device according to an embodiment of the present disclosure.

FIG. 4 shows a flowchart of a method 500 performed by a wireless device 100 configured for communication in a wireless communication network 300 according to an embodiment of the present disclosure.

In an embodiment, the method comprises obtaining 510 information indicative of a level of duplication of one or more common control signals or channels; and receiving 520 the common control signals or channels 2001 using the obtained level of duplication.

In an embodiment, the method comprises the steps of obtaining 510 a density of duplicated common control signals, e.g. of a total set of radio resources used by a network node 200. The density may be indicative of a mapping of one or more sets of radio resources selected from the total set of radio resources used by the network node, e.g. transmission BW of the node. In one example, the mapping comprise selecting on or more sets of time resources and frequency resources intended for transmission of common control signals. The method further comprises receiving 520 one or more of the duplicated common control signals 2001 using the plurality of sets of radio resources. The method may further comprise receiving one or more of the duplicated common control signals 2501 of a neighboring network node 250.

In one example, the wireless device 100 may obtain the density/duplication level from at least one common control signal/channel transmitted by one or more network nodes or TRPs. Examples of the common control signal/channel may be synchronization signals, reference signals, broadcast channels, etc. Obtaining 510 a density may be based on a determination dependent of one or more of a pre-defined value, a pre-defined rule or a message or indication or control message received from another node (e.g., via higher-layer or physical layer signaling, via dedicated, multicast or broadcast signaling), e.g., from a serving network node 200 or neighboring network node 250 or from another wireless device 100/UE. In one example, the UE is signaled information about the duplications of common control signals from the serving cell of the network node 200 and/or neighboring cells of one or more neighboring network nodes. Such information may be either explicit or implicit, e.g. an indication that the duplication in neighbor cells is identical to the duplication in the current cells.

In an embodiment, the obtained level of duplication indicates types of signals or channels to be duplicated and/or a number of duplicated signals or channels and/or radio resources to be used to transmit 430 the one or more common control signals or channels (2001).

In an embodiment, the one or more common control signal or channels comprise at least one of: synchronization signals, broadcast channels, PBCH, or signals/channels.

In an embodiment, the one or more common control signal or channels are further comprised in an SS block.

In an embodiment, obtaining 510 comprises determining the obtained level of duplication based on one or more of a pre-defined value, a pre-defined rule or a message or indication received from another node.

In an embodiment, the obtained level of duplication comprises an adapted density indicative of duplicated common control signals of a total set of radio resources used by a network node 200, and receiving 520 one or more of the duplicated common control signals 2001 is performed by using the adapted density.

In an embodiment, said adapted density is indicative of one or more sets of radio resources selected from the total set of radio resources and mapped to the one or more of the duplicated common control signals.

In an embodiment, the density and/or the adapted density is expressed as a periodicity in time between the one or more sets of radio resources.

In an embodiment, the density is expressed as a distance in frequency between the one or more sets of radio resources.

In an embodiment, the adapted density is based on bandwidth capability of the wireless device 100.

In an embodiment, the method further comprises sending a message or indication WDM comprising radio resources configuration information of the wireless device 100, wherein the radio resources configuration information comprises a selection of a supported level of duplication,
a preferred level of duplication,
a minimum required level of duplication,
a wireless device (100) capability related to the level of duplication,
sufficiency of the level of duplication, or
a level of duplication is currently configured with.

In an embodiment, the method further comprising, in response to receiving 520 the common control signals 2001 or channels, to perform one of:
configuring a receive bandwidth of the wireless device 100,
performing radio measurements and/or receiving one or more channels,
meeting one or more requirements of the wireless device 100,
relaxing one or more pre-defined requirements related to measurements and/or channel reception,
refraining from causing any interruption to signals transmitted between the wireless device 100, and the network node 200 when performing an operation, causing interruption to signals transmitted between the wireless device 100, and the network node 200 when performing the operation.

In an embodiment, the method further comprises obtaining a result of the wireless device 100 in response to receiving 520 the common control signals 2001 or channels using the obtained information.

In an embodiment, the obtained result is a selection of a measurement result, a result of a channel reading operation, a cell or beam identification result, a signal detection result.

In an embodiment, the method further comprises sending a message or indication WDM comprising radio resources configuration information.

In an embodiment, the resources configuration information comprises a selection of a supported density, a preferred density, a minimum density or a wireless device 100 capability related to the density.

In an embodiment, the adapted density is based on a selection of any of radio resources configuration information of at least one wireless device 100, radio resources capability information of at least one wireless device 100 or information indicative of one or more duplicated common control signals, which are transmitted or are about to be transmitted and are not essential to the operation of at least one UE.

In yet an embodiment, the method 500 further comprises obtaining an adapted density, wherein the adapted density is not exceeding the obtained density.

In yet an embodiment, the method 500 further comprises configuring a receive bandwidth of the wireless device 100 in response to receiving 520 the one or more of the duplicated common control signals 2001.

In yet an embodiment, the method 500 further comprising performing radio measurements and/or receiving one or more channels in response to receiving 520 the one or more of the duplicated common control signals 2001.

In yet an embodiment, the method 500 further comprises meeting one or more requirements of the wireless device 100 in response to receiving 520 the one or more of the duplicated common control signals 2001. In one example, the UE may meet one or more pre-defined requirements related to measurements and/or channel reception, e.g. throughput, SNR etc., provided that the signal and/or the common control channel used by the UE for performing the measurements and/or channel reception are transmitted with at least certain density, duplication level or number of duplication (M1) within the cell transmission BW.

In yet an embodiment, the method 500 further comprises relaxing one or more pre-defined requirements related to measurements and/or channel reception, e.g. throughput, SNR etc., of the wireless device 100 in response to receiving 520 the one or more of the duplicated common control signals 2001 if the density fulfills a criterion or criteria. In one example, the UE is allowed to relax one or more pre-defined requirements related to measurements and/or channel reception ( ) provided that the common control signal and/or the channel used by the UE for performing the measurements and/or channel reception are transmitted with a density, duplication level or number of duplication, N2, below a threshold, G1. E.g. the criterion if N2<G2, where N2≥1 within the cell transmission BW.

In yet an embodiment, the method 500 further comprises refraining from causing any interruption to signals transmitted between the UE and the network node when performing an operation, e.g. radio measurement on common control signals of a the network node 200, e.g. from a target cell. In one example, the UE is not allowed to cause any interruption to signals transmitted between the UE and the network node when performing an operation (e.g. radio measurement) on signals of a target cell (e.g. the serving and/or on the neighbor cells) provided that the target cell transmits the signals used by the UE for performing the measurements with number of duplication (N3) above a threshold (G2) (i.e. if N3>G3, where N3≥1) within the target cell's transmission BW. Signals transmitted between the UE and the network node may refer to signals transmitted on the uplink from UE to network node or downlink from network node to UE or in both directions.

In yet an embodiment, the method 500 further comprises causing interruption to signals transmitted between the UE and the network node when performing an operation, e.g. radio measurement on common control signals of a the network node 200, e.g. from a target cell. In an example, the UE is allowed to cause certain level of interruption to signals transmitted between the UE and the network node when performing an operation (e.g. radio measurement) on signals of a target cell (e.g. the serving and/or on the neighbor cells) provided that the target cell transmits the signals used by the UE for performing the measurements with number of duplication (N3) below or equal to a threshold (G3) (i.e. if N3≤G3, where N3≥1) within the target cell's transmission BW. Examples of level of interruption of signals are J1 number of interrupted time resources, J2% of missed time resources during a certain time period, J3% probability of missed ACK/NACK transmission in the UL by the UE in response to DL data transmission in all DL time resources by the serving cell to the UE.

In yet an embodiment, the method 500 further comprising obtaining a result of the wireless device 100 in response to receiving 520 the one or more of the duplicated common control signals 2001. Examples of the result may be a measurement result, a result of a channel reading operation, a cell or beam identification result, a signal detection result, etc.

The density may be expressed as a separation distance or periodicity in time between the one or more sets of radio resources. The density may further be expressed as a separation distance or periodicity/repetition in frequency between the one or more sets of radio resources.

In one embodiment, the method 500 further comprising sending an indication signal comprising radio resources configuration information, wherein the resources configuration information comprises a selection of a supported density, a preferred density, a minimum density or a wireless device (100) capability related to the density. The indication signal may be sent to the network node 200 or the neighboring network node 250. In an example, the UE may indicate to another node, e.g. the serving network node/BS, a radio network controller, another UE, core network node, positioning node, etc., a message or indication signal comprising radio resources configuration information, e.g. related to duplication level of one or more radio signals/channel it may need to receive. The message or indication signal may comprise, e.g., one or more of:

supported duplication level(s),
preferred duplication level(s),
minimum necessary level of duplication,
UE capability related to the duplication level, e.g., maximum reception bandwidth, supported numerologies, contiguous and/or non-contiguous in frequency reception, etc.
an indication of the sufficiency of a duplication level of a radio signal/channel, e.g., the UE may signal an indication that it is unable to attempt to search for a neighbor cell as it is not transmitting a duplication of the neighbor signal that the UE is capable of, or is currently configured to receive,
current duplication level the UE assumes or is configured to operate with.

The indication may be upon a request from another node or in an unsolicited way, upon a triggering condition or event.

Figure 5:
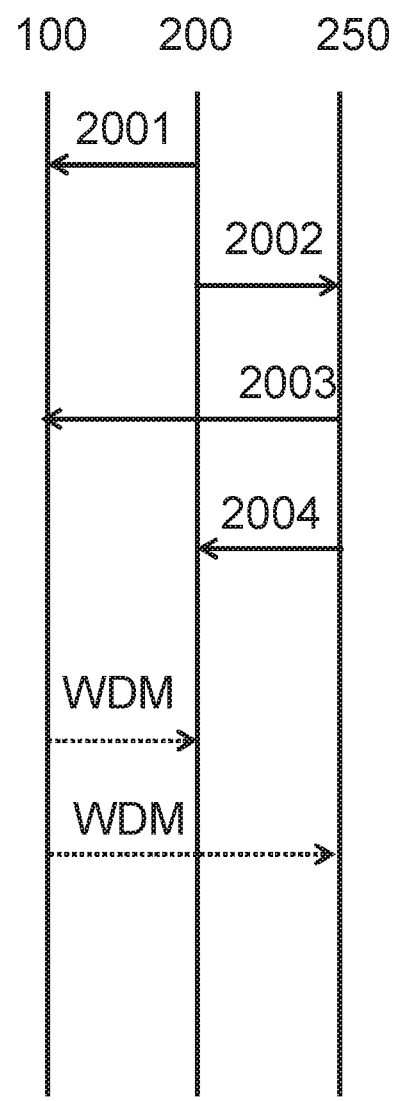
FIG. 5 schematically shows how signals are exchanged between wireless devices and network nodes according to an embodiment of the present disclosure.

FIG. 5 schematically shows how signals are exchanged between wireless devices and network nodes according to an embodiment of the present disclosure.

The network node 200 may be configured and/or operative to transmit the at least one common control signal or channel and/or common control signals 2001 to the wireless device 100 and/or to transmit a control signal 2002 to the neighboring network node 250, e.g. within the total set of radio resources or the transmission BW of the network node 200. The neighboring network node 250 may be configured and/or operative to transmit at least one common control signal or channel and/or common control signals 2501 to the wireless device 100, e.g. within the total set of radio resources or the transmission BW of the neighboring network node 250, and/or to receive a control signal 2002 from the network node 200 an/or to transmit a neighboring control signal 2004 to the network node 200. The wireless device 100 may be configured and/or operative to transmit and/or send a message or indication WDM to the network node 200 and/or to the neighboring network node 250.

Figure 6:
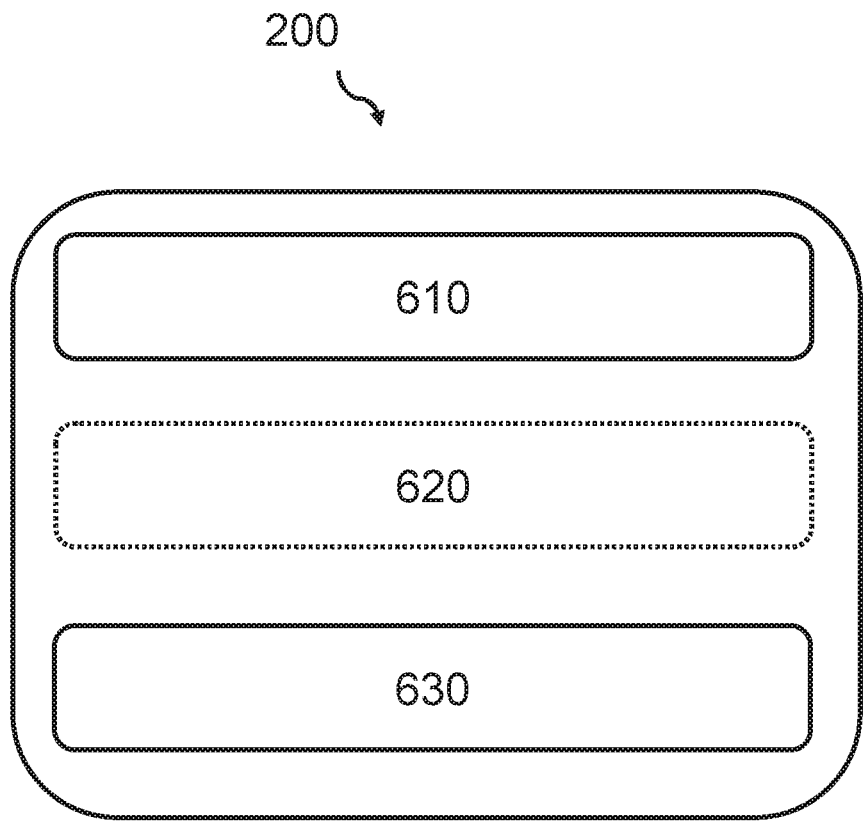
FIG. 6 shows a network node according to an embodiment of the present disclosure.

FIG. 6 shows a network node according to an embodiment of the present disclosure. The network node 200 may comprise a determination module 610 an optional mapping module 620 and a transmitting module 630.

Figure 7:
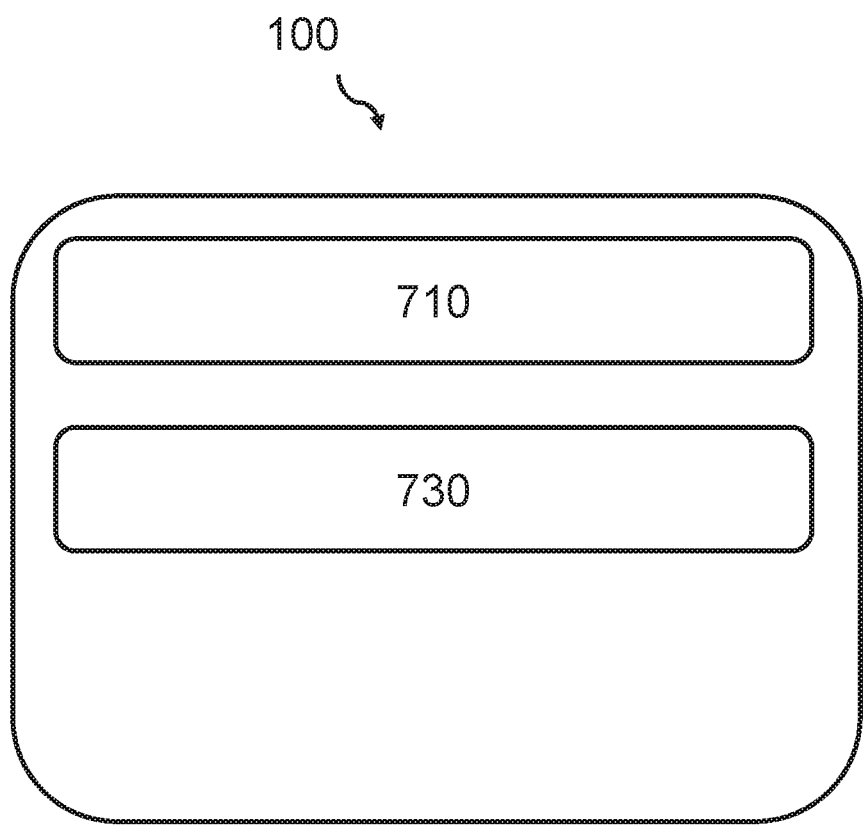
FIG. 7 shows a wireless device according to an embodiment of the present disclosure.

FIG. 7 shows a wireless device 100 according to an embodiment of the present disclosure. The wireless device may comprise an obtaining module (710) and a receiving module (730).

Figure 8:
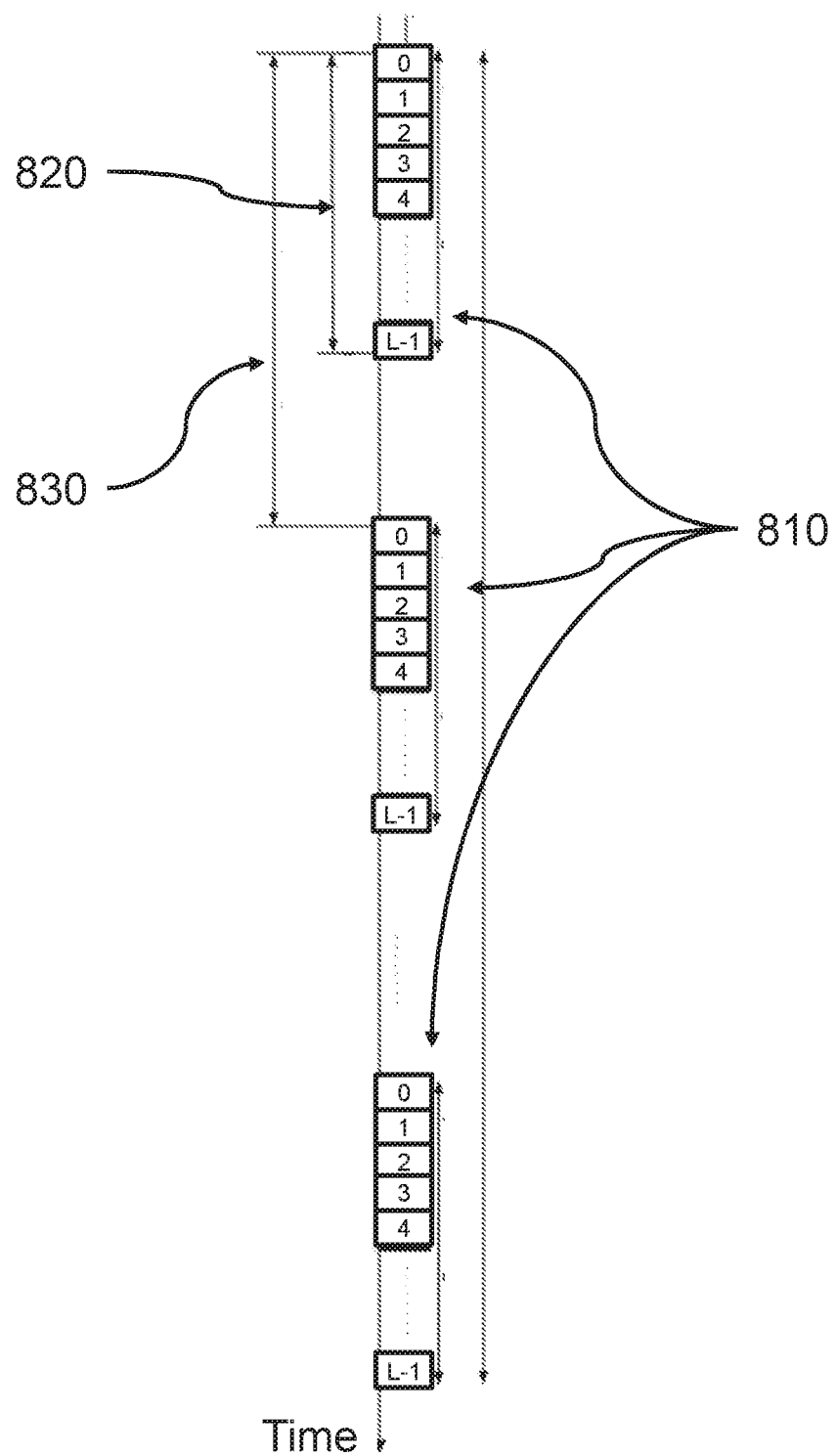
FIG. 8 illustrates sets of radio resources used for transmission of common control signals.

FIG. 8 illustrates sets of radio resources used for transmission of common control signals. Three sets of radio resources 810 are shown. The sets 810 are used for transmission of common control signals in the form of duplicated synchronization signal blocks forming a signal burst and a signal burst series. Each set occupy a number of time resources 820. The duplication is shown in the time domain and shows separation distance or periodicity 830 in time between the one or more sets of radio resources. Similar concepts of duplication may be applied in the frequency domain.

The inventors have realized that transmitting duplicate copies of common control signals is unnecessary, except when there are UEs which are going to make use of the duplicate copies of the common control signals. In a non-limiting example, if all the devices within a cell and within the neighboring cells of that cell happen to be devices that support and are currently configured to operate with a wide bandwidth, there would be no need to duplicate common control signals in frequency domain, since the currently connected devices should be able to receive the common control signal regardless of which region of frequency domain it occupies. A new narrowband device may be powered on within the cell, but again, provided that it searches for the cell with sufficient granularity it should be able to receive common control signals from the cell regardless of the exact frequency range in which they are transmitted.

This means that it is possible to develop procedures for the management of, and adaptation of, duplications of signals. Only when at least N (e.g., N=1, 2, ...) devices needs to make use of a duplicated signal is it necessary to transmit such duplicated signal. As indicated in the background section, the duplication could be performed in either time domain or frequency domain. Alternatively, even in this case it may be possible (as a choice) to avoid transmitting additional duplicated signals by instead reconfiguring the device in question to receive a different range of frequencies or to receive during a different period of time where common control signals are already available. Since an important usage of common control signals is for detection of cells for mobility purposes, the adaptation of duplicate signals may well also need to take account of the UEs in neighbor cells. For example, a network node may be informed by a neighboring network node that the neighbor network node is serving one or more UEs with limited bandwidth capabilities. The network node may use this information from the neighbor network node as a trigger to start transmitting a new duplication of signals such as synchronization signals so that the UE in the neighbor cell is able to detect the cell in question.

Further Information

NR Architecture

Figure 9:
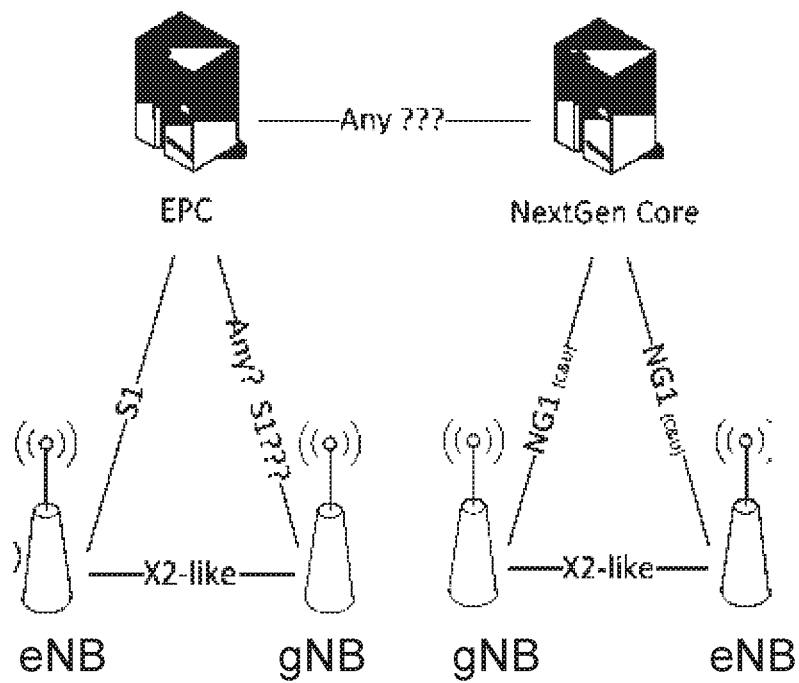
FIG. 9 illustrates a 5G or Next Generation system architecture.
Figure 10:
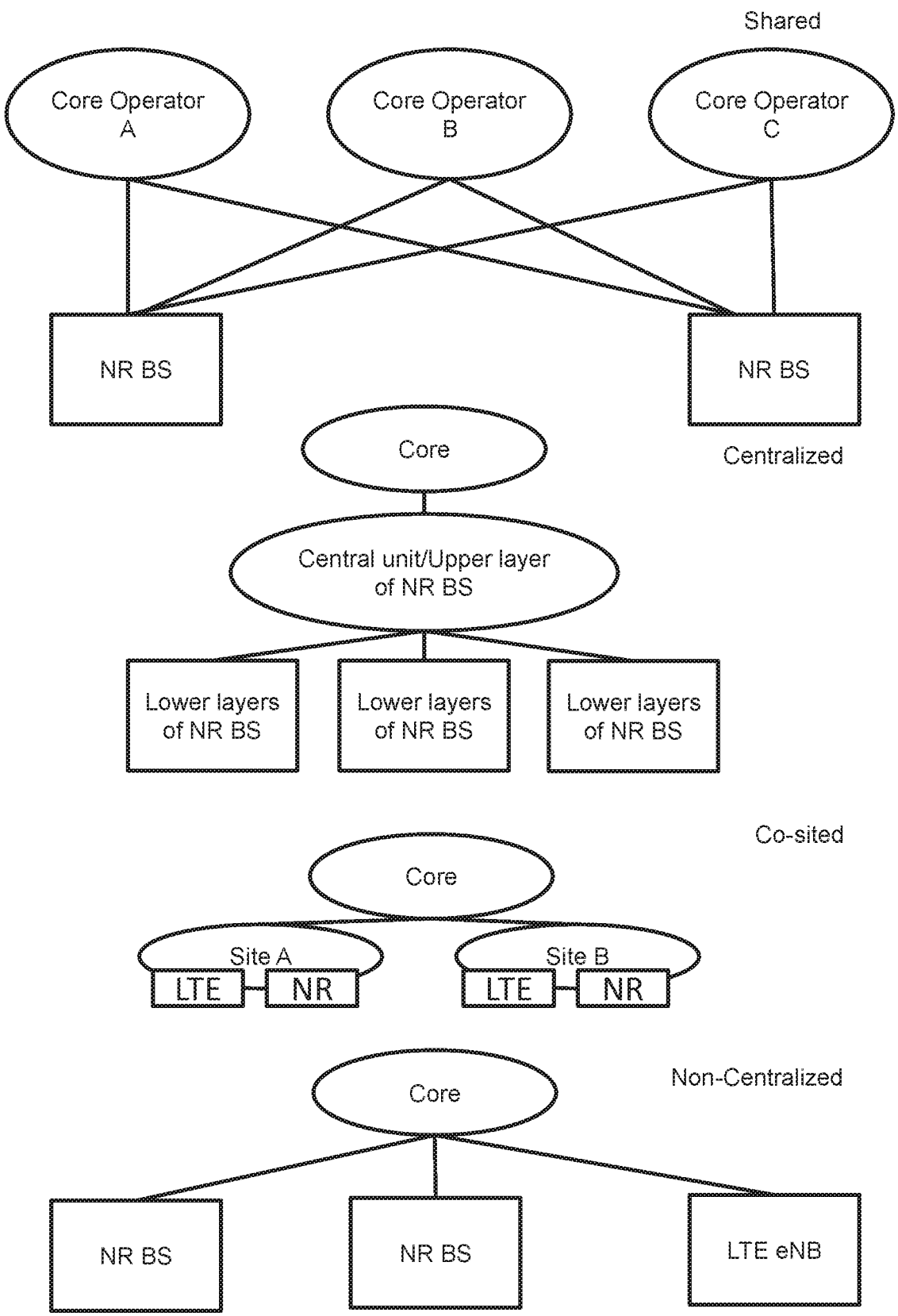
FIG. 10 illustrates deployment scenarios with NR BS.

NR (a.k.a. 5G or Next Generation) architecture is being discussed in 3GPP and the current concept is illustrated in FIG. 9, where eNB denotes LTE eNodeB, gNB denotes NR BS (one NR BS may correspond to one or more transmission/reception points), and the lines between the nodes illustrate the corresponding interfaces which are under discussion in 3GPP. Further, FIG. 10 illustrates deployment scenarios with NR BS which are discussed in 3GPP.

Supported Bandwidth for User Equipment and Network

In LTE, standardized mobility procedures are based on downlink measurements. In both idle and RRC connected states, UEs make measurements of downlink resources, typically cell specific reference symbols (CRS) although measurement based on channel state information reference symbols (CSI-RS) are specified in later releases. In idle mode, UEs perform autonomous reselection between cells, based on reselection criteria which are configured by the network, along with their measurements. In RRC connected state, mobility is controlled by the eNB which may configure UEs to report measurements periodically or based on an event trigger. In either case, the UE measures the downlink and reports measurements to the network which may then be used to trigger mobility procedures such as handover, or Scell change in the case of carrier aggregation. In 5G (also known as NR) the transmission bandwidth of a single carrier transmitted by a network node (also known as gNB) may be larger than the UE bandwidth capability, or the configured receiver bandwidth of a connected device (such as UE). Each gNB may also transmit using different numerologies which are time division multiplexed (TDM) or frequency division multiplexed (FDM). To detect, measure and access the gNB various common control signals have been discussed or could be envisaged such as Synchronization signals such as primary synchronization signal, secondary synchronization signal (PSS, SSS, or generically xSS)

Broadcast channel, also known as physical broadcast channel (PBCH) which may carry system information or some part of the system information known as essential system information Reference signals which are known symbols transmitted to allow various operations to be performed including measurement of the network node. Measurement metrics could involve measurement of received signal strength indication, signal quality, signal to noise and interference ratio (SINR), reference signal received power etc.

Numerology

Figures 11A, 11B:
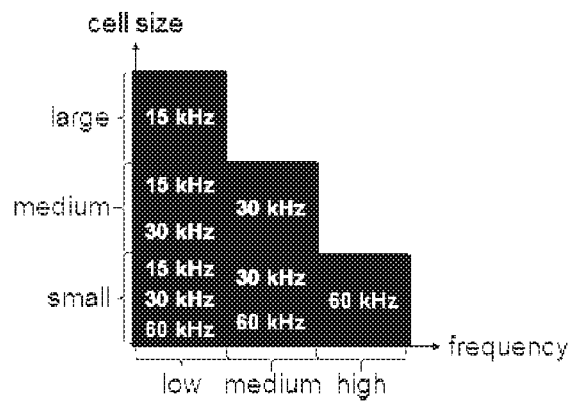
FIG. 11A illustrate candidate carrier spacing.
FIG. 11B show details of time durations for candidate carrier spacing.

For LTE, the term "numerology" includes, e.g., the following elements: frame duration, sub-frame or TTI duration, slot duration, subcarrier spacing, cyclic prefix length, number of subcarriers per RB, number of RBs within the bandwidth (different numerologies may result in different numbers of RBs within the same bandwidth). The exact values for the numerology elements in different radio access technologies are typically driven by performance targets, e.g., performance requirements impose constraints on usable subcarrier spacing sizes, e.g., the maximum acceptable phase noise sets the minimum subcarrier bandwidth while the slow decay of the spectrum (impacting filtering complexity and guard-band sizes) favors smaller subcarrier bandwidth for a given carrier frequency, and the required cyclic prefix sets the maximum subcarrier bandwidth for a given carrier frequency to keep overhead low. However, the numerology used so far in the existing RATs is rather static and typically can be trivially derived by the UE, e.g., by one-to-one mapping to RAT, frequency band, service type (e.g., MBMS), etc. In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers. The support of multiple numerologies has been agreed for NR, which can be multiplexed in the frequency and/or time domain for the same or different UEs. In NR which is to be based on OFDM, multiple numerologies will be supported for general operation. A scaling approach (based on a scaling factor $2^n$, $n \in N\_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of $(2m*15)$ kHz gives exactly ½m 0.5 ms for a slot that is 0.5 ms in the 15 kHz numerology. Subcarrier spacings of at least up to 480 kHz are currently being discussed for NR (the highest discussed values correspond to millimeter-wave based technologies). It was also agreed that multiplexing different numerologies within a same NR carrier bandwidth is supported, and FDM and/or TDM multiplexing can be considered. It was further agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that very low subcarrier spacing will not be used at very high carrier frequencies. In FIG. 11A, some candidate carrier spacing are illustrated with respect to the frequency and cell range. In FIG. 11B Table 1, further details are provided on corresponding time durations for some candidate carrier spacing.

Sync and Broadcast Channels in NR

NR defines at least two types of synchronization signals, e.g. NR-PSS at least for initial symbol boundary synchronization to a NR cell and NR-SSS for detection of NR cell ID or at least part of NR cell ID. The number of NR cell IDs is targeted to be at least 504. NR-SSS detection may be based on the fixed time/freq. relationship with NR-PSS resource position irrespective of duplex mode and beam operation type at least within a given frequency range and CP overhead. Further, NR defines at least one broadcast channel: NR-PBCH. NR-PBCH decoding is based on the fixed relationship with NR-PSS and/or NR-SSS resource position irrespective of duplex mode and beam operation type at least within a given frequency range and CP overhead. The following options of broadcasting schemes to carry essential system information may be considered Option 1: NR-PBCH carries a part of essential system information for initial access including information necessary for UE to receive channel carrying remaining essential system information Option 2: NR-PBCH carries minimum information necessary for UE to perform initial UL transmission (not limited to NR-PRACH) in addition to information in Option 1.

Option 3: NR-PBCH carries all essential system information for initial access

It is understood that other options are not precluded.

It is a working assumption in 3GPP that:

Wider transmission bandwidth for NR-PSS/SSS and/or PBCH than that for LTE-PSS/SSS/PBCH may be supported at least for a subcarrier spacing larger than 15 kHz. For configurations using a transmission bandwidth below 6 GHz containing NR-PSS/SSS/PBCH is not more than [5 or 20] MHz. For configurations using a transmission bandwidth below 40 GHz containing NR-PSS/SSS/PBCH is not more than [40 or 80] MHz.

Unified DL Sync Signals Structure

PSS, SSS and/or PBCH common control channels may be transmitted within a 'SS block'. Multiplexing other signals is not precluded within a 'SS block'. One or multiple 'SS block(s)' compose an 'SS burst' One or multiple 'SS burst(s)' compose a 'SS burst set'. The number of SS bursts within a SS burst set is finite. E.g., periodic/aperiodic transmission of SS burst sets.

SYNC Periodicity

From a RAN1 specification perspective, NR air interface defines at least one periodicity of SS burst set. The lowest value of the periodicity of SS burst set is X ms, e.g., 5 ms, 40 ms, 80 ms. The interval of SS bursts may be the same as interval of SS burst set in some cases, e.g., in single beam operation. The main bullet can be applied to PSS, SSS and/or PBCH.

Synch Signals

At least one subcarrier spacing for each synchronization signal (e.g. NR PSS, SSS, PBCH) is predefined in the specification for a given frequency range. RAN1 should study the number of subcarrier spacing in a given frequency range and strive for minimizing the number of subcarrier spacing.

It has been discussed whether there is a need to support scenarios where synchronization signal(s) of neighbor cells may not be on the same center frequency. For intra/inter frequency DL measurement, two options below are discussed:

Option 1: The network can signal a reduced set of frequency locations of the sync signal(s) including the case where synchronizations signal(s) of neighbor cells are at the same frequency location as the synchronizations signal(s) of the UE's serving cell.

Option 2: The UE may always assume the same frequency location of the synchronization signal(s) among neighbor cells.

Discussions on the Proposal

The candidate frequency locations of synchronization signal(s) may be sparser than the possible frequency locations of the center of NR carrier bandwidth. The spacing (Hz) between the candidate frequency locations of synchronization signal(s) may depend on the frequency bands used. This does not preclude that for certain bands, the candidate frequency locations of synchronization signals and the possible frequency locations of center of NR carrier bandwidth may be the same. A UE should not assume a fixed frequency separation between the frequency location of synchronization signal(s) and the center of NR carrier bandwidth.

In an embodiment, a computer program comprising computer-executable instructions for causing a wireless device, when the computer-executable instructions are executed on a processing unit comprised in the wireless device, to perform any of the method steps described herein.

In an embodiment, a computer program product comprising a computer-readable storage medium, the computer-readable storage medium having the computer program described above embodied therein.

In an embodiment, a carrier containing the computer program described above, wherein the carrier is one of an electronic signal, optical signal, radio signal, or computer readable storage medium.

Moreover, it is realized by the skilled person that the wireless device 100, 200, 250 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor of the present wireless device 100, 200, 250 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

Embodiments

Embodiment 0. A method (400) in a network node (200) for communication in a wireless communication network (300), the method comprising:

obtaining (410) information of a level of duplication of at least one common signal or channel; and transmitting (1430) the at least one common signal or channel (2001), using the obtained level of duplication, to at least one wireless device (100).

Embodiment 1. The method (400) according to any preceding embodiment, wherein the information of a level of duplication indicates types of signals or channels to be duplicated and/or number of duplicated signals or channels and/or radio resources to be used.

Embodiment 2. The method (400) according to any preceding embodiment, wherein obtaining (410) comprises determining the information of a level of duplication based on one or more of a pre-defined value, a pre-defined rule or a message or indication received from another node.

Embodiment 3. The method (400) according to any preceding embodiment, further comprising transmitting a message or indication (2002) to a second network node (250) indicative of the information of a level of duplication of at least one common signal or channel.

Embodiment 4. The method (400) according to any preceding embodiment, further comprising:
   determining an adapted density based on the information of a level of duplication of at least one common signal or channel, and
   sending a message or indication comprising the adapted density to the wireless device 100.

Embodiment 5. A method (500) in a wireless device (100) for communication in a wireless communication network (300), the method comprising the steps of:
   obtaining (510) information of a level of duplication of one or more common signals or channels; and
   receiving (520) the common signals (2001) or channels using the obtained information.

Embodiment 6. The method (500) according to any preceding embodiment, wherein obtaining (510) comprises determining the information of a level of duplication based on one or more of a pre-defined value, a pre-defined rule or a message or indication received from another node.

Embodiment 7. The method (500) according to any preceding embodiment, further comprising sending a message or indication (WDM) comprising radio resources configuration information.

Embodiment 8. The method (500) according to embodiment 7, wherein the radio resources configuration information comprises a selection of
   a supported level of duplication,
   a preferred level of duplication,
   a minimum required level of duplication,
   a wireless device (100) capability related to the level of duplication,
   sufficiency of the level of duplication, or
   a level of duplication is currently configured with.

Embodiment 9. The method (500) according to any preceding embodiment, further comprising obtaining an adapted level of duplication indicating a minimum mandatory level of duplication, wherein the adapted level of duplication is not exceeding the obtained level of duplication.

Embodiment 10. The method (500) according to any preceding embodiment, further comprising, in response to receiving (520) the common signals (2001) or channels, to perform one of:
   configuring a receive bandwidth of the wireless device (100),
   performing radio measurements and/or receiving one or more channels,
   meeting one or more requirements of the wireless device (100),
   relaxing one or more pre-defined requirements related to measurements and/or channel reception,
   refraining from causing any interruption to signals transmitted between the wireless device (100), and the network node (200) when performing an operation,
   causing interruption to signals transmitted between the wireless device (100), and the network node (200) when performing the operation.

Embodiment 11. The method (500) according to any preceding embodiment, further comprising obtaining a result of the wireless device (100) in response to receiving (520) the common signals (2001) or channels using the obtained information.

Embodiment 12. The method (500) according to embodiment 11, wherein the result is a selection of a measurement result, a result of a channel reading operation, a cell or beam identification result, a signal detection result.

Embodiment 13. A method (400) performed by a network node (200) configured for communication in a wireless communication network (300), the method comprising:
   determining (410) a density of duplicated common control signals of the total set of radio resources,
   mapping (420) one or more sets of radio resources, selected from the total set of radio resources, based on the density of duplicated common control signals,
   transmitting (430) the duplicated common control signals (2001) using the one or more sets of radio resources.

Embodiment 14. The method (400) according to embodiment 13, wherein the density is expressed as a periodicity in time between the one or more sets of radio resources.

Embodiment 15. The method (400) according to any preceding embodiment, wherein the density is expressed as a periodicity in frequency between the one or more sets of radio resources.

Embodiment 16. The method (400) according to any preceding embodiment, wherein determining (410) the density is based on radio resources configuration information of at least one wireless device (100).

Embodiment 17. The method (400) according to any preceding embodiment, wherein the method further comprises:
   transmitting a control signal (2002) to a second network node (250) indicative of the density of duplicated common control signals and/or the plurality of sets of radio resources.

Embodiment 18. A method (500) performed by a wireless device (100) configured for communication in a wireless communication network (300), the method comprising the steps of:
   obtaining (510) a density of duplicated common control signals of a total set of radio resources used by a network node (200), said density being indicative of a mapping of one or more sets of radio resources selected from the total set of radio resources,
   receiving (520) one or more of the duplicated common control signals (2001) using the plurality of sets of radio resources.

Embodiment 19. The method (500) according to embodiment 18, wherein the density is expressed as a periodicity in time between the one or more sets of radio resources.

Embodiment 20. The method (500) according to any preceding embodiment, wherein the density is expressed as a periodicity in frequency between the one or more sets of radio resources.

Embodiment 21. The method (500) according to any preceding embodiment, further comprising sending an indication signal comprising radio resources configuration information, wherein the resources configuration information comprises a selection of a supported density, a preferred density, an minimum density or a wireless device (100) capability related to the density.

Embodiment 22. The method (500) according to any preceding embodiment, further comprising obtaining an adapted density, wherein the adapted density is not exceeding the obtained density.

Embodiment 23. The method (500) according to any preceding embodiment, further comprising configuring a receive bandwidth of the wireless device (100) in response to receiving (520) the one or more of the duplicated common control signals (2001).

Embodiment 24. The method (500) according to any preceding embodiment, further comprising performing radio measurements and/or receiving one or more channels in response to receiving (520) the one or more of the duplicated common control signals (2001).

Embodiment 25. The method (500) according to any preceding embodiment, further comprising meeting one or more requirements of the wireless device (100) in response to receiving (520) the one or more of the duplicated common control signals (2001).

Embodiment 26. The method (500) according to any preceding embodiment, further comprising obtaining a result of the wireless device (100) in response to receiving (520) the one or more of the duplicated common control signals (2001).

Embodiment 27. A network node (200) configured for communication in a wireless communication network (300) by using one or more sets of radio resources selected from a total set of radio resources, comprising circuitry comprising:
  a processor (102), and
  a memory (106), said memory containing instructions executable by said processor, whereby said network node (200) is operative and/or configured to perform the method of any of embodiments 0-4 and/or 13-17.

Embodiment 28. The network node (200) according to embodiment 27, wherein the network node (200) is a gNB.

Embodiment 29. A computer program comprising computer-executable instructions for causing a network node (200), when the computer-executable instructions are executed on a processing unit comprised in the wireless device, to perform the method of any of embodiments 0-4 and/or 13-17.

Embodiment 30. A computer program product comprising a computer-readable storage medium, the computer-readable storage medium having the computer program according to embodiment 29 embodied therein.

Embodiment 31. A carrier containing the computer program of embodiment 29, wherein the carrier is one of an electronic signal, optical signal, radio signal, or computer readable storage medium.

Embodiment 32. A wireless device (100) configured for communication in a wireless communication network (300), comprising circuitry comprising:
  a processor (102), and
  a memory (106), said memory containing instructions executable by said processor, whereby said first wireless device is operative to perform the method of any of embodiments 5-12 and/or 18-26.

Embodiment 33. A wireless device (100) according to embodiment 31, wherein the wireless device (100) is a sub-band UE.

Embodiment 34. A computer program comprising computer-executable instructions for causing a network node (200), when the computer-executable instructions are executed on a processing unit comprised in the wireless device, to perform any of the method steps of any of embodiments 5-12 and/or 18-26.

Embodiment 35. A computer program product comprising a computer-readable storage medium, the computer-readable storage medium having the computer program according to embodiment 33 embodied therein.

Embodiment 36. A carrier containing the computer program of embodiment 33, wherein the carrier is one of an electronic signal, optical signal, radio signal, or computer readable storage medium.

Embodiment 37. A network node (200) configured for communication in a wireless communication network (300), the network node (200) interacting with a wireless device (100) and a second network node (250), the network node (200) comprising:
  an obtaining module (1210) for obtaining information of a level of duplication of at least one common signal or channel; and
  a transmitting module (1230) for transmitting the at least one common signal or channel (2001), using the obtained level of duplication, to at least one wireless device (100).

Embodiment 38. A wireless device (100) configured for communication in a wireless communication network (300), A wireless device (100) interacting with a network node (200) and a second network node (250), the wireless device (100) comprising:
  an obtaining module (1310) for obtaining information of a level of duplication of one or more common signals or channels; and
  a receiving module (1330) for receiving the common signals (2001) or channels using the obtained information.

Embodiment 39. A network node (200) configured for communication in a wireless communication network (300), the network node (200) interacting with a wireless device (100) and a second network node (250), the network node (200) comprising:
  a determining module (610) for determining a density of duplicated common control signals of the total set of radio resources,
  an optional mapping module (620) for mapping one or more sets of radio resources, selected from the total set of radio resources or the transmission bandwidth of the network node (200), based on the density,
  a transmission module (630) for transmitting (430) the duplicated common control signals (2001) using the density.

Embodiment 40. A wireless device (100) configured for communication in a wireless communication network (300), the wireless device (100) interacting with a network node (200), and a second network node (250), the wireless device (100) comprising:
  an obtaining module (710) for obtaining a density of duplicated common control signals of a total set of radio resources used by a network node (200), said density being indicative of a mapping of one or more sets of radio resources selected from the total set of radio resources,
  a receiving module (730) for receiving one or more of the duplicated common control signals (2001) using the plurality of sets of radio resources.

The invention claimed is:

1. A method in a network node for communication in a wireless communication network, the method comprising:
  transmitting duplications of a common control signal according to a determined level of duplication, for reception by respective wireless devices present in a target cell of the communication network or present in a neighbor cell of the target cell; and
  determining the level of duplication in dependence on reception frequencies and numerologies usable by the respective wireless devices;

wherein each duplication of the common control signal uses a respective frequency and numerology usable by at least one of the respective wireless devices.

2. The method according to claim 1, wherein each duplication uses different radio resources of a carrier used by the network node for transmitting the duplications.

3. The method according to claim 1, wherein transmitting the duplications of the common control signal comprises transmitting the duplications in the frequency domain, or in the time domain, or in a mix of the frequency and time domains.

4. The method according to claim 1, further comprising determining the reception frequencies and numerologies usable by the respective wireless devices according to information indicating radio capabilities and configurations of the respective wireless devices.

5. The method according to claim 1, wherein determining the level of duplication comprises determining the minimum number of duplications needed to provide each wireless device among the respective wireless devices with a transmission of the common control signal that is receivable by the wireless device.

6. The method according to claim 5, further comprising reconfiguring, or initiating reconfiguration of, one or more of the wireless devices among the plurality of plurality of wireless devices, to reduce the minimum number of duplications needed.

7. A network node configured for communication in a wireless communication network, the network node comprising:

processing circuitry; and a memory, the memory containing instructions executable by the processing circuitry, whereby the network node is operative to:

transmit duplications of a common control signal, according to a determined level of duplication, for reception by respective wireless devices present in a target cell of the communication network or present in a neighbor cell of the target cell; and determine the level of duplication in dependence on reception frequencies and numerologies usable by respective wireless devices;

wherein each duplication of the common control signal uses a respective frequency and numerology usable by at least one of the respective wireless devices.

* * * * *